(12) United States Patent
Boschi et al.

(10) Patent No.: US 9,387,992 B2
(45) Date of Patent: Jul. 12, 2016

(54) SYSTEM FOR FORMING LAYERS OF PACKAGES TO BE PALLETIZED, AND PALLETIZATION PLANT THEREOF

(75) Inventors: Andrea Boschi, Vicofertile (IT); Matteo Zoppas, Conegliano (IT)

(73) Assignee: S.I.P.A. Societa' Industrializzazione Progettazione E. Automazione S.P.A., Vittorio Veneto (IT)

( * ) Notice: Subject to any disclaimer, the term of this patent is extended or adjusted under 35 U.S.C. 154(b) by 314 days.

(21) Appl. No.: 13/138,692

(22) PCT Filed: Mar. 22, 2010

(86) PCT No.: PCT/IB2010/051236
§ 371 (c)(1),
(2), (4) Date: Sep. 19, 2011

(87) PCT Pub. No.: WO2010/106529
PCT Pub. Date: Sep. 23, 2010

(65) Prior Publication Data
US 2012/0009053 A1    Jan. 12, 2012

(30) Foreign Application Priority Data
Mar. 20, 2009  (IT) ............................. RM2009A0121

(51) Int. Cl.
*B65G 57/22*   (2006.01)
*B65G 47/90*   (2006.01)
(Continued)

(52) U.S. Cl.
CPC ........... *B65G 47/907* (2013.01); *B25J 15/0052* (2013.01); *B65G 47/086* (2013.01); *B65G 47/904* (2013.01)

(58) Field of Classification Search
CPC ............... B25J 15/0052; B25J 15/0057; B25J 15/0061; B25J 15/0253; B25J 17/0241; B65G 47/90; B65G 47/904; B65G 47/086; B65G 57/03; B65G 57/24; B65G 57/26; B65G 47/244; B65G 57/10
USPC ............ 414/791.6, 788, 1, 789.6, 798.7, 680, 414/733, 739, 741
See application file for complete search history.

(56) References Cited

U.S. PATENT DOCUMENTS 3,601,266 A * 8/1971 Pearne et al. .................. 414/796
3,951,283 A * 4/1976 Lingl, Jr. ....................... 414/802
(Continued)

FOREIGN PATENT DOCUMENTS

DE    2810834    9/1979
DE    3907331    7/1990
(Continued)

*Primary Examiner* — Saul Rodriguez
*Assistant Examiner* — Lynn Schwenning
(74) *Attorney, Agent, or Firm* — Stetina Brunda Garred & Brucker

(57) ABSTRACT

A gripping head (1) comprises a supporting element (11), e.g. a horizontal plate, adapted to rotate about a first rotation axis (&alpha,-) with which two or more grippers (12) are pivotally associated, so that each gripper is adapted to rotate about a symmetry axis (β) thereof, said rotation axes being parallel to each other, and being the rotation motion of each gripper independent from the others. Therefore, each gripper is adapted to rotate about a symmetry axis (β) thereof and revolve about the rotation axis (α) of the supporting element with which they are pivotally associated. A preferred plant, comprising said gripping head (1), comprises a belt conveyor and a mechanical limb (2) with which said gripping head (1) is pivotally associated.

19 Claims, 4 Drawing Sheets

(51) Int. Cl.
  *B25J 15/00*       (2006.01)
  *B65G 47/08*       (2006.01)

(56) References Cited

U.S. PATENT DOCUMENTS

| | | | | |
|---|---|---|---|---|
| 4,164,296 | A * | 8/1979 | Trees | 414/416.02 |
| 4,221,517 | A * | 9/1980 | Guzzetta et al. | 414/788.6 |
| 4,444,424 | A * | 4/1984 | Lebret | 294/87.1 |
| 4,850,783 | A * | 7/1989 | Maekawa | 414/792.9 |
| 5,328,319 | A * | 7/1994 | Fadaie | 414/416.01 |
| 5,553,442 | A * | 9/1996 | Fadaie | 53/445 |
| 6,206,172 | B1 * | 3/2001 | Abe | 198/403 |
| 6,223,887 | B1 * | 5/2001 | Andou | 198/468.1 |
| 6,290,448 | B1 * | 9/2001 | Focke et al. | 414/222.01 |
| 6,830,425 | B2 * | 12/2004 | Padovani | 414/802 |
| 7,226,270 | B2 * | 6/2007 | Hwang et al. | 414/749.1 |
| 7,407,363 | B2 * | 8/2008 | Okuno | 414/806 |
| 2004/0223839 | A1 * | 11/2004 | Simkowski | 414/791.6 |
| 2006/0099064 | A1 * | 5/2006 | Anaki et al. | 414/797 |
| 2006/0167587 | A1 * | 7/2006 | Read | 700/245 |
| 2009/0024142 | A1 * | 1/2009 | Ruiz Morales | 606/130 |
| 2009/0066098 | A1 * | 3/2009 | Subotincic | 294/65 |
| 2010/0068027 | A1 * | 3/2010 | Mitchell | 414/789.9 |
| 2010/0316479 | A1 * | 12/2010 | Perl | 414/791.6 |
| 2012/0039699 | A1 * | 2/2012 | Ward et al. | 414/792.7 |

FOREIGN PATENT DOCUMENTS

| | | |
|---|---|---|
| EP | 0266056 | 5/1988 |
| JP | 05002843 | 1/1993 |
| JP | 11254367 | 9/1999 |
| JP | 2001239484 | 9/2001 |

* cited by examiner

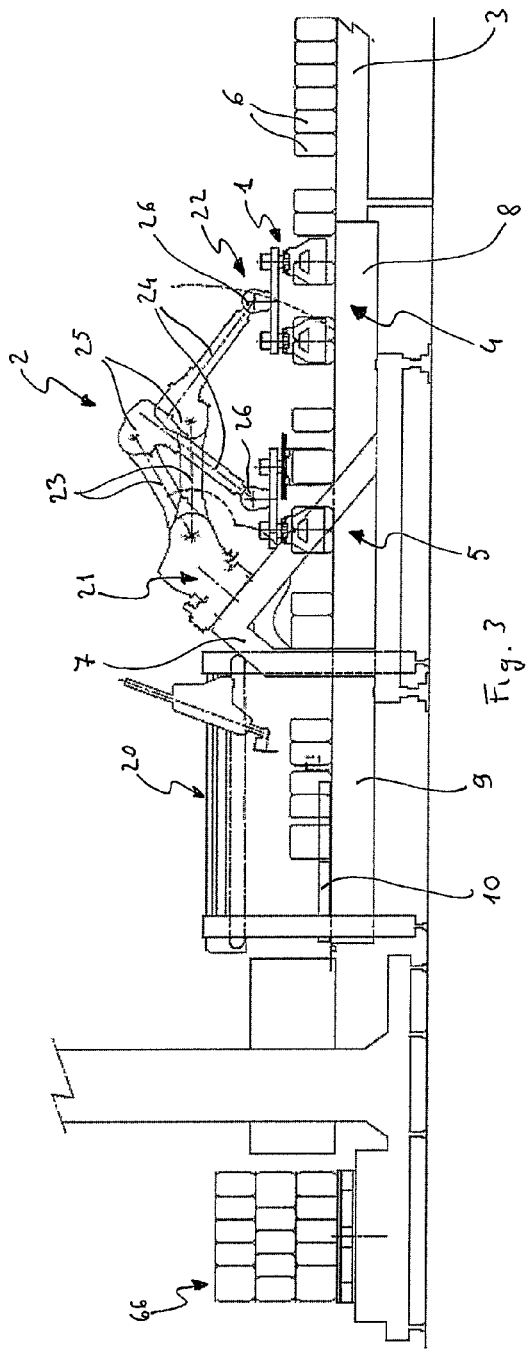
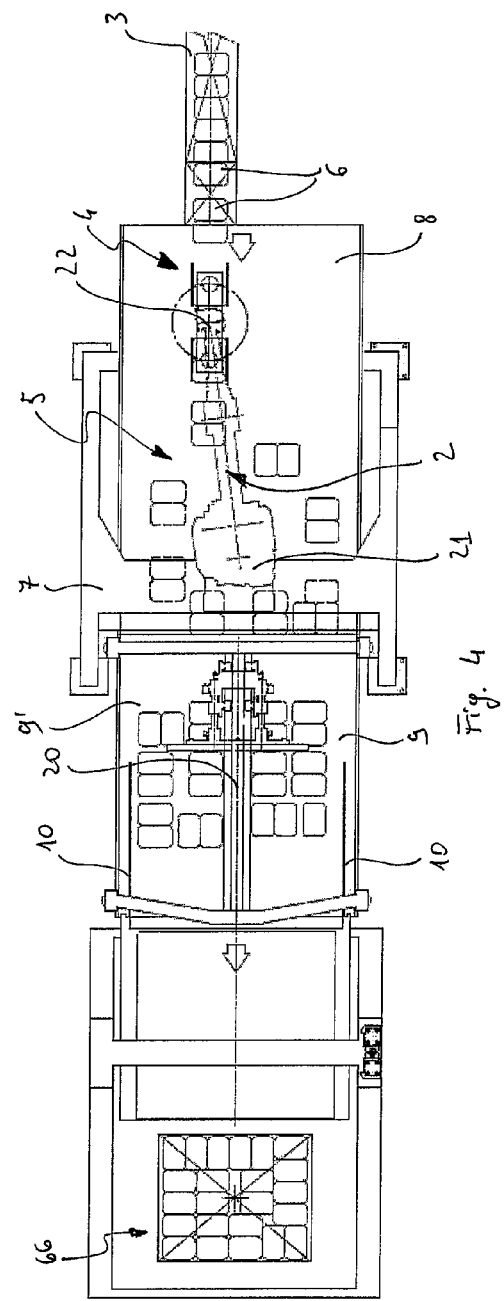

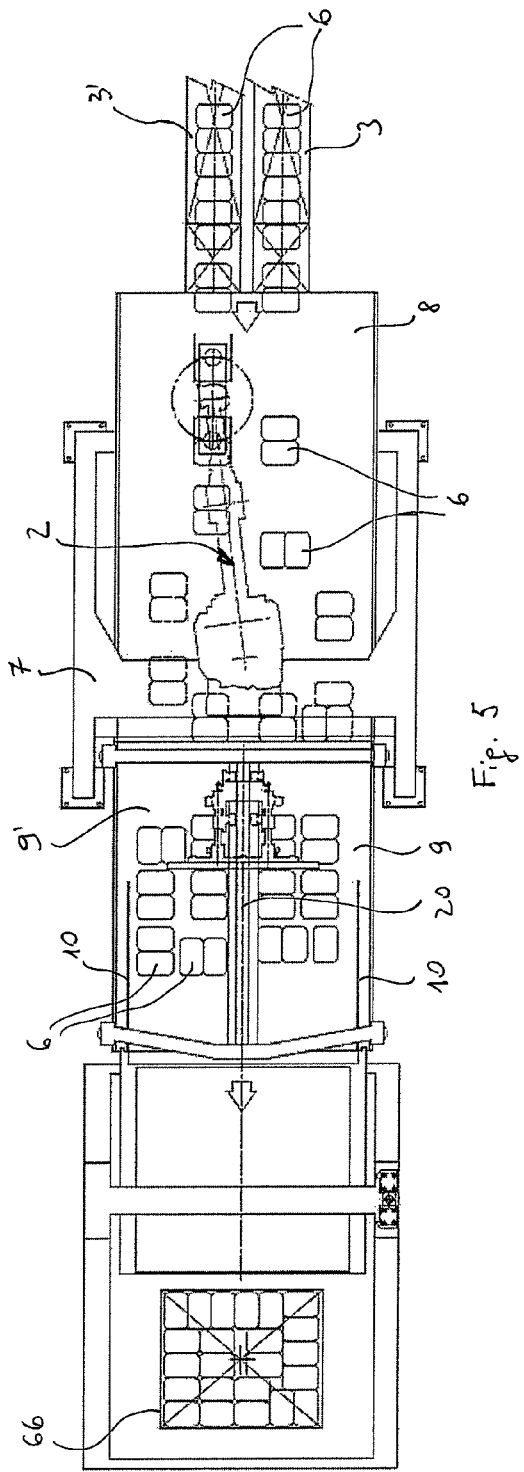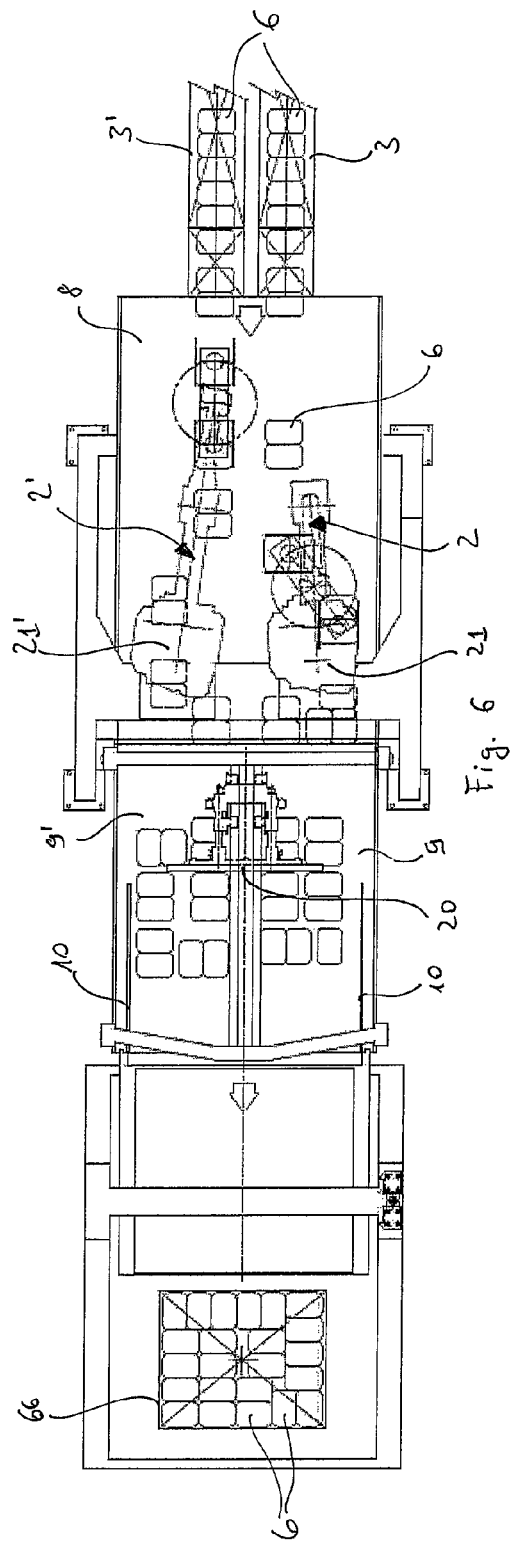

SYSTEM FOR FORMING LAYERS OF PACKAGES TO BE PALLETIZED, AND PALLETIZATION PLANT THEREOF

FIELD OF THE INVENTION

The present invention relates to a system of forming layers of packages to be palletized for a palletization plant, and to a palletization plant thereof.

STATE OF THE ART

Some types of palletization plant solutions, needed to group loads together so as to optimize their positioning on a pallet, are known. All systems have a belt conveyor or similar means in common, which conveys loads, packages or generally blocks of objects to a handling zone, so as to form the configuration which best occupies the surface of a pallet.

A type of plant provides for a mechanical arm gripping only one package by linearly moving it on a pallet in the correct position.

Such a solution does not ensure high performance in terms of handling speed and its performance is absolutely modest in relation to the current production cycle needs.

Another type provides for a belt conveyor conveying the packages to a handling zone where they are singularly translated and/or rotated to be transported by the same belt conveyor or by a different one onto the pallet.

In a known plant of this second type, a second belt is arranged over and parallel to a first belt conveyor which conveys the packages, which second belt synchronously conveys handling means with respect to the movement of the packages. Each handling means may move only one package and comprises a gripper capable of rotating about the symmetry axis thereof and to translate transversally with respect to the movement direction of the belt conveyors. In order to ensure high productivity, such a solution needs a high number of handling means which makes the plant highly complex and large in size.

Whereby a first problem is to limit the dimensions of the system without reducing the productivity of the palletization system.

But the main technical problem is that the known systems are not easily adaptable to a large variety of dimensions of the packages, especially when it is intended to pack sets of packages of different width and/or depth together as the height of every layer made on a pallet is generally homogenous because the packages defining a layer have a same height.

SUMMARY OF THE INVENTION

It is, an object of the present invention to provide a system of forming layers of packages to be palletized, adapted to solve the aforesaid problems.

It is an object of the present invention a system for forming layers of packages to be palletized, said packages being able to be fed on longitudinal conveyor means, the system according to claim 1 comprising:
  at least one robot controlling a limb,
  a multiple gripping head for gripping at least two packages, coupled at a first end of said limb,
  said multiple gripping head being provided with
    a supporting element, adapted to rotate about a first rotation axis α,
    two or more grippers pivotally associated with the supporting element, each gripper being adapted to rotate about a respective second rotation axis β,
  wherein the robot is provided with translation and rotation movements so as to move the gripping head between a gripping zone and a releasing zone of packages, said gripping and releasing zones being defined at a portion of said longitudinal conveying means,
  and wherein said first rotation axis α and said second rotation axes β are parallel to one another and the rotation of each gripper about the respective second axis β is independent from the rotation of the other grippers,
  whereby the packages taken by said grippers may be translated and/or rotated about said second rotation axes β in a reciprocally independent manner and/or rotated about said first rotation axis α.

The robot is advantageously provided with synchronization means for synchronizing the movements of the gripping head with at least two packages being fed on said longitudinal conveying means. Said synchronization means comprise at least one sensor adapted to detect the packages being fed towards the gripping zone and transmit a trigger signal to a first encoder included in an actuating motor of at least part of the longitudinal conveying means on which the layer of packages is formed; said first encoder being adapted to send a speed and position reference signal of the packages to the robot.

Actuating means for actuating the rotation motion of respective grippers and of the supporting element are included. Said actuating means comprise brushless motors and the robot is provided with motion transmission axes for transmitting a rotation to the respective grippers and to the supporting element, respectively.

The brushless motors are provided with respective second encoders. The first and the second encoders may be incremental encoders.

According to an aspect of the invention, said system is best applied when said supporting element is formed by a flat plate kept in the horizontal position with respect to the plane defined by the conveying means underneath.

According to a further aspect of the invention, said system is best applied when said supporting element is adapted to rotate about a rotation axis thereof parallel to the rotation axes of the grippers.

Each gripper is advantageously adapted to rotate about a rotation axis thereof, possibly coinciding with the symmetry axis of said grippers, and to revolve about the rotation axis of the horizontal supporting plate with which it is pivotally associated or coupled, so that two or more packages may rotate about themselves in an independent manner while being translated when they are fed on the belt conveyor.

A further object of the invention is to provide a palletization plant of modest dimensions and high production capacity.

It is a further object of the present invention a palletization plant according to claim 17.

The dependent claims describe preferred embodiments of the invention forming an integral part of the present description.

BRIEF DESCRIPTION OF THE DRAWINGS

Further features and advantages of the present invention will be apparent in the light of the detailed description of a preferred, but not exclusive, embodiments of a system of forming layers of packages to be palletized, and of a palletization plant thereof illustrated by way of non-limitative example, with the aid of the accompanying drawings, in which:

FIG. 3 shows a side view of a palletization plant comprising a multiple gripping head according to the preceding figures, FIG. 4 shows a plan view of the palletization plant in FIG. 3, FIGS. 5 and 6 show variants of the plan view in FIG. 4.

The same reference numbers and letters in the figures refer to the same elements or components.

DETAILED DESCRIPTION OF PREFERRED EMBODIMENTS OF THE INVENTION

Figure 1:
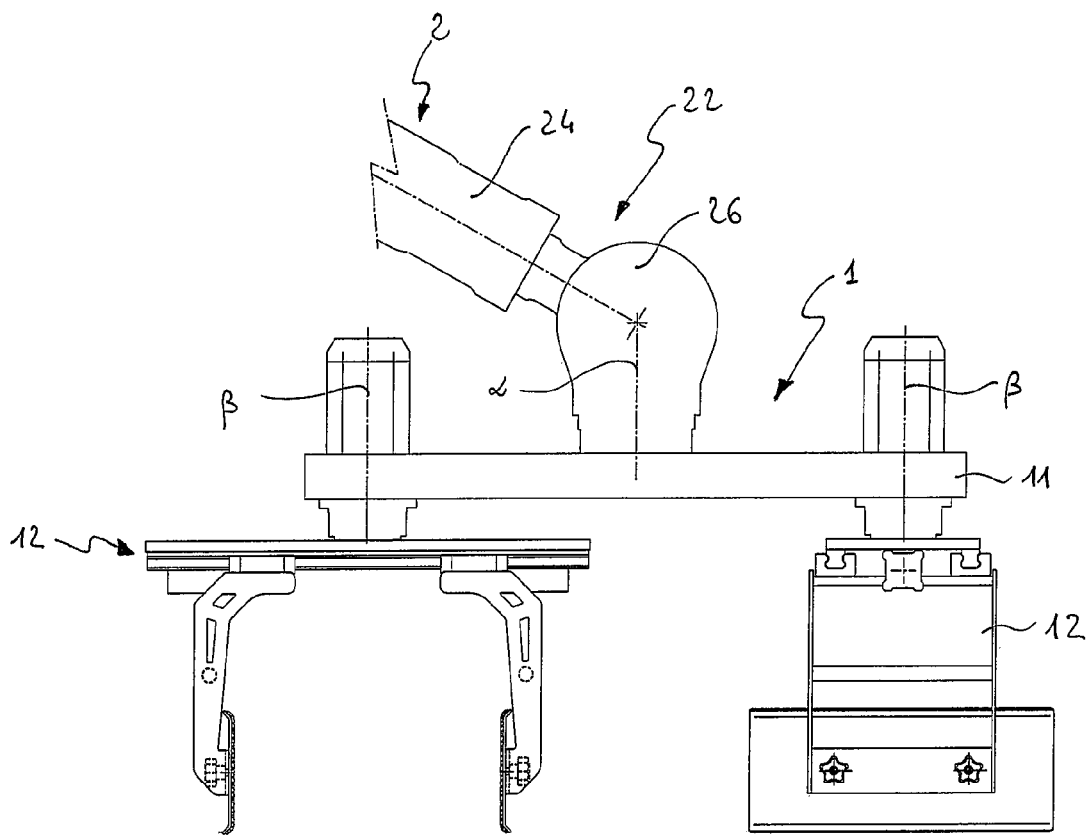
FIG. 1 shows a side view of a multiple gripping head.
Figure 2:
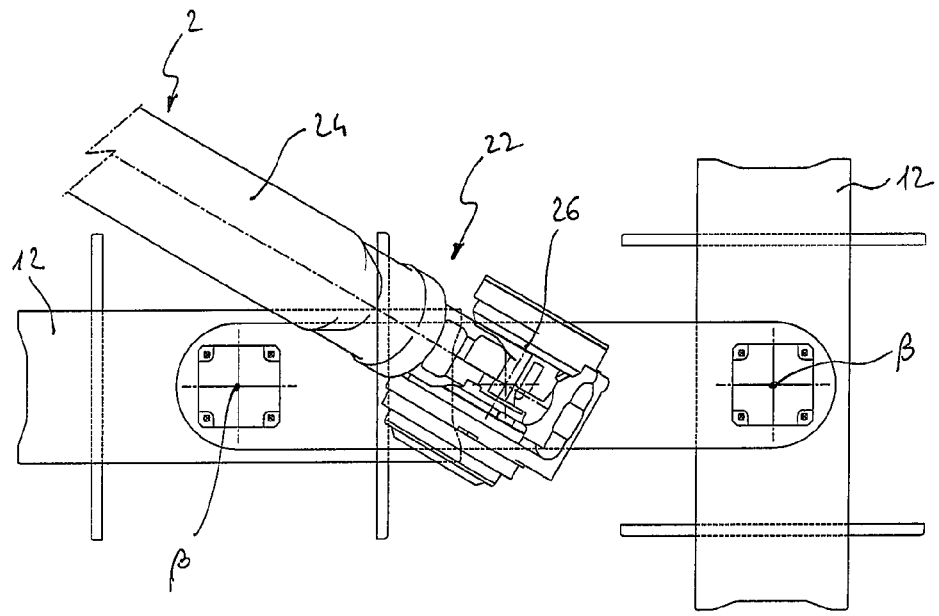
FIG. 2 shows a top view of the multiple gripping head in FIG. 1.

A gripping head 1 according to the present invention may be advantageously used to independently rotate two or more packages belonging to an equal number of package alignments, leaving the subsequent formation of the layer to be made by means of one or more pushers 20.

A multiple gripping head 1 in accordance with the present invention comprises a supporting element 11, e.g. a flat plate, adapted to rotate about a first rotation axis $\alpha$. Two or more grippers 12 are pivotally associated with said supporting element 11, so that each gripper is adapted to rotate about a rotation axis $\beta$ thereof, e.g. a symmetry axis thereof, said rotation axes $\alpha$ and $\beta$ being parallel to each other.

In other words, each gripper 12 is adapted to rotate about a preferably vertical rotation axis $\beta$ thereof and revolve about the rotation axis $\alpha$ of the supporting element 11 (preferably vertical as well) with which it is pivotally associated.

Furthermore, for the specific use, the supporting element 11 is preferably a flat plate.

Thereby, each gripper 12 grips a package comprising one or more objects, e.g. bottles for beverages, and rotates and/or translates it by virtue of the combination of its rotation and revolution motions.

Furthermore, each gripper 12 grips packages and rotates about its rotation axis $\beta$ independently from the others, comprising actuating means thereof. Said actuating means advantageously comprise brushless motors with incremental encoder, which solution ensures the perfect movement interpolation and synchronism.

According to another preferred embodiment (not shown), two or more grippers 12 are pivotally associated with said supporting element 11, one of which grippers has a rotation axis $\beta$ coinciding with the rotation axis $\alpha$ of the supporting element 11. In this case, such a gripper would be the only one not to perform a revolution motion about said axis $\alpha$, but to perform only a rotation.

A palletization plant in accordance with the present invention comprises longitudinal conveying means of the packages to be palletized, comprising at least one belt conveyor and a robot provided with a limb 2, e.g. a mechanical or electromechanical limb. Said limb 2 comprises a kinematic chain. In particular, it comprises an arm 23, a forearm 24, an elbow 25 and a wrist 26.

In FIG. 3, such a limb 2 is shown in two positions taken during its handling.

Such a limb 2 has a first end 21 pivotally constrained to the ground, preferably restrained to a supporting structure 7 fixed to the ground which surmounts part of the longitudinal conveying means of the packages and, by comprising a kinematic chain, may extend and retract so as to able to move a second end 22 thereof along an entire portion of the longitudinal package conveying means. Said multiple gripping head 1 is pivotally associated with the second end 22 of the robot limb 2. The rotation of each gripper 12 of the gripping head 1 is independent from the rotation of the other grippers of the same head 1. The management of the rotation of grippers 12 and supporting plate 11 itself is integrated in the robot (two supplementary robot axes are provided corresponding to respective grippers 12) and ensures the perfect rotation movement interpolation and accuracy.

The multiple gripping head 1 is translated by the robot by means of the mechanical limb 2 on the belt for forming the layer of packages, to be later transferred to a layer accumulation pallet, along two axes x and y belonging to the plane defined by said belt, perfectly synchronized with the package or packages to be handled.

The gripping head 1 may be also coupled to the end 22 of limb 2 by means of a joint so as to allow any spatial movement to the gripping head itself.

In particular, the robot is advantageously provided with eight axes:
  a first axis is that of the robot foot, i.e. the axis which allows the rotation of the whole body of the robot;
  second and third axes allow the forward and backward inclination of arm 23 and forearm 24 of the limb 2 of the robot (FIG. 3);
  a fourth axis allows the rotation of the forearm 24 with respect to the elbow 25 of limb 2;
  a fifth axis allows the oscillation of the gripping head 1, and thus of the supporting element 11, with respect to the wrist 26 of limb 2;
  a sixth axis allows the rotation of the supporting element 11 about the rotation axis $\alpha$;
  the seventh and eighth axes are the aforesaid two supplementary axes of the robot which allow the rotation of the respective grippers 12 about the rotation axes $\beta$.

All robot axes are coordinated so as to ensure that the supporting element 11 is always arranged parallel to a plane defined by the longitudinal conveying means of the packages 6.

The synchronization between the robot, i.e. the gripping head 1, and the package to be handle occurs by means of a trigger signal (object detection) triggered by at least one appropriate sensor, e.g. at least one photocell, which detects the packages being fed towards the gripping zone. Said trigger signal is transmitted to an incremental encoder provided in the actuating motor of the belt on which the layer is formed. A signal sent by said encoder acts as a speed and position reference of the packages and is used by the robot to calculate and control the tracking of each single package to be handled.

The robot may be thus perfectly "coupled" by means of the grippers 12 of the gripping head 1 with at least two packages 6 being handled at a relative speed equal to zero.

All robot axes, included the rotation axes of grippers 12 and of supporting plate 11 are actuated by brushless motors, independent from one another, provided with incremental encoders so as to ensure the perfect interpolation and synchronism of movements. Both the incremental encoder included in the actuating motor of the belt on which the layer is formed and the incremental encoders of the various brushless motors are managed by a robot software. Other types of encoders may be used alternatively to incremental encoders.

In a first preferred variant, the longitudinal conveying means of the packages 6 may comprise:
  at least one first belt conveyor 3 for feeding packages 6 from a production or storage zone to the palletization plant;

a second belt conveyor 8, following the first belt conveyor, over which at least one robot provided with mechanical limb 2 works; said second belt conveyor 8 crosses a gripping zone 4 and a releasing zone 5 of the packages 6 handled by the gripping head 1 associated with limb 2;

at least one third belt conveyor, following the second belt conveyor, for compacting the packages 6, released by the robot in a predetermined configuration, towards a palletization or stacking station.

The longitudinal conveying means of the packages may comprise, in a second variant, a first belt conveyor for feeding packages from a production or storage zone towards the palletization plant, and a second belt conveyor which accommodates the packages unloaded from the first belt. Said second belt is partially surmounted by the supporting structure of at least one robot and conveys the packages to the accumulation pallet of the package layers. Said at least one robot provided with a mechanical limb 2 and a gripping head 1 works at the gripping zone and at the releasing zone, both the zones being crossed by said second belt (see example in FIG. 7).

The longitudinal conveying means of the packages 6 may comprise, in a third variant, a single belt conveyor partially surmounted by the supporting structure of at least one robot, which conveys the packages from the production or storage zone towards the palletization plant to the package layer accumulation pallet. Said at least one robot provided with a mechanical limb 2 and a gripping head 1 works at the gripping zone and at the releasing zone both crossed by said single belt.

With particular reference to said first variant, corresponding to the embodiments in FIGS. 3 to 6, the positioning of the mechanical limb 2 with respect to the second belt conveyor 8 is such to allow it to move longitudinally with respect to the belt conveyor 8 when extending and retracting the mechanical limb, and to move transversally with respect to the feeding direction of the belt 8 by rotating about said first end 21.

The belt conveyor 3 carries the packages 6 towards the gripping zone 4, to allow the mechanical limb 2 to grip one or more packages 6, to rotate-translate them while retracting or longitudinally extending or rotating about said first end 21, and to release them in the releasing zone 5. Such a releasing zone 5 may be provided, in addition to on the second belt 8, on the single belt conveyor in the third variant described above or directly on the package accumulation pallet.

In addition to independently rotating from the other grippers about its rotation axis β and about the rotation axis α of the supporting plate 11, each gripper 12 advantageously translates and/or rotates according to the movements carried out by the mechanical limb 2 about the second end 22.

With particular reference to FIGS. 3 to 6, being carried by a first belt conveyor 3, the packages 6 reach the gripping zone 4, e.g. defined at a portion of the second belt conveyor 8.

For example, the packages arrive on one row and appropriately spaced out one from the other, or on two, three rows, etc. again appropriately spaced out from the preceding and following ones.

Then the mechanical limb 2 synchronously moves, by means of the aforesaid robot synchronization means, with the belt conveyor which crosses the gripping zone 4 and the releasing zone 5 to take the packages 6 from said gripping zone 4 and carry them to said releasing zone 5.

The packages 6 are preferably laterally clamped by the grippers 12 and are carried to the releasing zone 5 by sliding on the belt conveyor without being lifted. Therefore, the gripping head 1 is preferably adapted to be lowered from the top by the mechanical limb 2, so that the flat plate 11 with which the grippers 12 are pivotally associated is parallel to the plane defined by the gripping zone 4.

When the gripping head 1 comprises two grippers 12, the robot grips two packages 6 aligned to each other according to the feeding direction of the belt conveyor 8, for example, and drags them in rotation-translation, so that they may also be side-by-side along a transversal direction to the feeding direction of the belt conveyor 8, if the rotation of the supporting plate 11 is 90°.

If two packages 6 are required to be side-by-side and very close to each other, a small rotation is imposed on the supporting plate 11 and an appropriate rotation is imposed to the grippers 12, so as to keep the axes associated with the packages parallel or orthogonal to each other, etc.; the belt conveyor 8 then carries and compacts them in the feeding sense thereof on belts 9 and 9'; a specific pusher 20 then intervenes, which transfers the compacted layer to the stacking module.

Once the packages 6 have been released into the releasing zone 5, the mechanical limb 2 is lifted clear and returns towards the gripping zone 4 at maximum speed, and the cycle is repeated.

The packages 6 released in the releasing zone 5 continue along the belt and are accumulated according to a configuration required by a palletization diagram.

According to FIG. 4, the plant comprises a belt conveyor 3 adapted to convey one or more alignments of packages 6 towards the gripping zone 4. Alternatively, according to FIG. 5, the plant comprises two belt conveyors 3, 3' adapted to convey two or more package alignments 6 towards the gripping zone 4.

Furthermore, the movement of said belt conveyors, e.g. at least two 3 and 3', is independent and synchronized with the operations carried out by the mechanical limb 2.

According to another preferred embodiment of the plant shown in FIG. 6, two or more mechanical arms 2, 2' are provided so as to cooperate to the formation of a group 66 of packages to be packaged. Such a plant comprises a pair of belt conveyors 3, 3', arranged side-by-side, a respective mechanical limb 2, 2' being associated with each of them, comprising a gripping head in accordance with the present invention.

The two mechanical arms 2, 2' are advantageously adapted to work independently from each other, while contributing to the formation of a same group 66 of packages according to a given diagram.

The first ends 21, 21' of the mechanical arms are preferably pivotally constrained to a supporting structure 7 which is over said second belt conveyor 8, of size proportional to the dimensions of the group diagram 66, so that said second belt conveyor 8 passes underneath the mechanical arms.

Except for when packages 6 fail to arrive from the feeding (production or storage) zone and/or the downstream packaging system is stopped, the work cycle of the mechanical limb 2 or mechanical arms 2, 2' is continuous and synchronized with the belt conveyor 8.

According to FIGS. from 4 to 6, the conveying means of the packages 6 comprise, starting from the right:

a first belt conveyor 3, 3', a second belt conveyor 8, wider than the first belt 3, 3' in the transversal sense, defining both the gripping zone 4 and the releasing zone 5 and on which the packages 6 are rotated-translated, a pair of third belts 9 and 9' arranged side by side, and adapted to work independently from each other, on which the packages 6 are accumulated and compacted from opposite side guides 10 to form a layer of the group 66 which is then stacked by means of appropriate stacking means.

Running on the belts 8, 9 and 9', the packages 6 pass under the supporting structure 7 which supports one or more mechanical arms 2.

Figure 7:
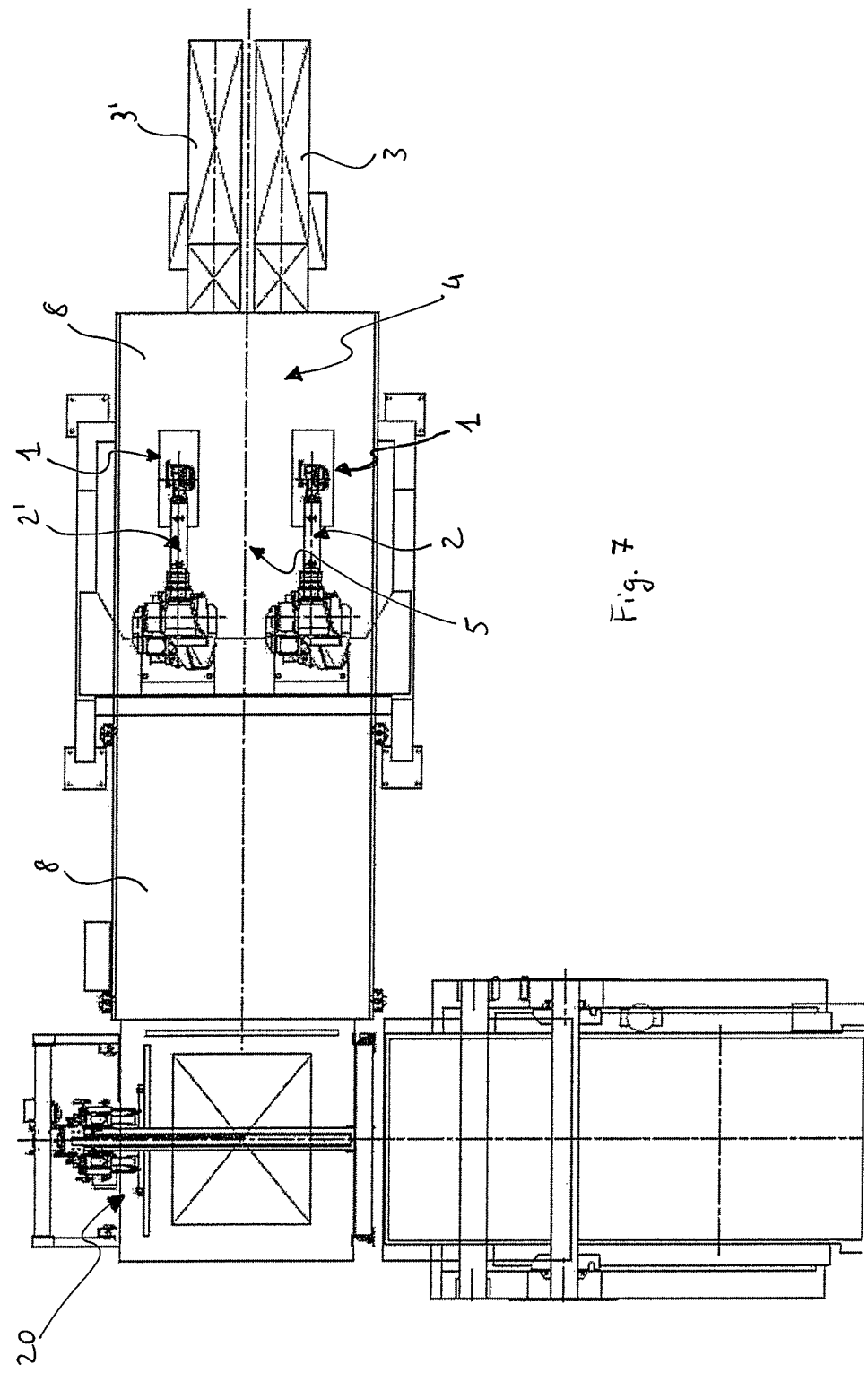
FIG. 7 shows a variant in which the layering zone of a group is at 90° with respect to a handling direction for the packages to be palletized.

Finally, FIG. 7 shows a variant in which the group 66 of packages is transferred by a pusher 20 configured to push the packages unloaded from the second belt 8 or alternatively from the third belts 9, 9' in a second direction which is substantially orthogonal to the handling direction of the packages 6 from the gripping zone 4 to the releasing zone 5.

The advantages deriving from the application of the present invention are apparent:

- a high production rate may be ensured thus limiting dimensions because the belt conveyor 3 may be of modest transversal dimensions because, due to said gripping head and to said mechanical limb, the packages may be conveyed aligned in a single row, but it desired also on several rows and distributed on one or more belt conveyors 3, 3', etc.;
- using a mechanical limb allows to rapidly adapt the plant to both different palletizing diagrams and to different package sizes, because the opening of the grippers 12 and the rotation angle required for them to accomplish about the rotation axes $\alpha$ and $\beta$ are easily adjustable, as well as the height of the mechanical limb from the plane of the gripping zone 4 on which the packages arrive.

The elements and features illustrated in the various embodiments may be combined without therefore departing from the scope of protection of the present application.

The invention claimed is:

1. A system for arranging packages for palletization, said packages being fed on a longitudinal conveyor system defining a travel direction, the system comprising
   at least a limb,
   at least one robot controlling the limb,
   multiple gripping heads for gripping at least two packages, coupled at a first end of said limb,
   said multiple gripping heads being provided with
      a supporting element, adapted to rotate about a first rotation axis ($\alpha$),
      two or more grippers pivotally associated with the supporting element, each gripper being adapted to rotate about a respective second rotation axis ($\beta$),
   wherein the supporting element is rotateable about the first rotation axis so as to traverse the two or more grippers transverse or parallel to the travel direction of the longitudinal conveyor system, and the grippers are each rotateable about the second rotation axis to orient the packages differently with respect to each other,
   wherein the robot and limb are operative to translate the gripping heads from a gripping zone to a releasing zone of the longitudinal conveyor system, and the robot is operative to rotate the packages about the first and second rotation axes as the packages are being translated to the releasing zone and release the packages in the releasing zone in an orientation suitable for palletization,
   wherein said first rotation axis ($\alpha$) and said second rotation axes ($\beta$) are parallel to one another with the first rotation axis ($\alpha$) interposed between the second rotation axes ($\beta$) and linearly aligned to the second rotation axes ($\beta$), the rotation of each gripper about the respective second axis ($\beta$) being independent from the rotation of the other grippers.

2. The system according to claim 1, wherein the robot is provided with a synchronization device for synchronizing the movements of each of the gripping heads with at least two packages being fed on said longitudinal conveyor system.

3. The system according to claim 2, wherein said synchronization device comprises at least one sensor adapted to detect the packages being fed towards the gripping zone and transmit a trigger signal to a first encoder provided in an actuating motor of at least part of the longitudinal conveyor system on which the layer of packages is formed; said first encoder being adapted to send a speed and position reference signal of the packages to the robot.

4. The system according to claim 1, further comprising an actuating device for actuating the rotation motion of the respective grippers and of the supporting element are provided.

5. The system according to claim 4, wherein said actuating device comprises brushless motors and the robot is provided with motion transmission axes for transmitting a rotation to the respective grippers and to the supporting element, respectively.

6. The system according to claim 5, wherein said brushless motors are provided with respective second encoders.

7. The system according to claim 6, wherein said first and second encoders are incremental encoders.

8. The system according to claim 1, wherein said supporting element is a flat plate.

9. The system according to claim 1, wherein said grippers are adapted to laterally clamp one or more packages to be palletized.

10. The system according to claim 1, wherein said limb comprises a kinematic chain, said kinematic chain being rotationally restrained at a second end of the limb.

11. The system according to claim 10, wherein said limb is restrained at said first end to a supporting structure which is placed above at least part of said longitudinal conveyor system.

12. The system according to claim 1, wherein said longitudinal conveyor system comprises:
   at least one first belt conveyor for feeding packages from a production or storage zone to a palletization plant;
   a second belt conveyor, following the first belt, over which said at least one robot provided with the limb works; said second belt conveyor crossing the gripping zone and the releasing zone of the packages handled by the gripping head;
   at least one third belt conveyor, following the second belt, for compacting the packages released by the robot in a predetermined configuration, towards a palletization station.

13. The system according to claim 12, further comprising a pair of third belt conveyors, adapted to work independently from each other, provided with appropriate side guides for forming a layer of packages which is then stacked by appropriate stacking means.

14. The system according to claim 1, wherein said longitudinal conveyor comprises:
   at least one first belt conveyor for feeding packages from a production or storage zone to a palletization plant;
   a second belt conveyor, following the first belt, over which said at least one robot provided with the limb works; said second belt conveyor crossing the gripping zone and the releasing zone of the packages handled by the gripping head;
   wherein said second belt conveyor is adapted to convey the packages, released by the robot in a predetermined configuration, to a package layer accumulation pallet.

15. The system according to claim 1, wherein said longitudinal conveyor system comprise a single belt conveyor over which said at least one robot provided with a limb works; said single belt conveyor crossing the gripping zone and the releasing zone of the packages handled by the gripping head; wherein said single belt conveyor is adapted to convey the packages from the production or storage zone to the palletization plant to reach a pallet for accumulating the layers of packages.

16. The system according to claim 1, wherein two robots and two limbs are provided, each robot being provided with one of said two limbs and comprising a respective gripping head.

17. A palletization plant comprising a system for forming layers of objects according to claim 1.

18. A method for arranging packages transported on a conveyor system, the method comprising the steps of:
   traversing a first package along a travel direction of the conveyor system;
   traversing a second package behind the first package along the travel direction of the conveyor system so that the first and second packages are in line with the travel direction of the conveyor system;
   traversing a gripping system toward a gripping zone of the conveyor system;
   rotating a frame of the gripping system about rotational axis ($\alpha$) to align first and second gripping heads to the travel direction of the conveyor system;
   rotating the first and second gripping heads about respective rotational axes ($\beta$) to grip the first and second packages wherein the rotational axes ($\alpha$) and ($\beta$) are linearly aligned to each other;
   gripping the first and second packages with the first and second gripping heads;
   traversing the first and second gripping heads and the first and second packages to a releasing zone of the conveyor system; and
   releasing the first and second packages from the first and second gripping heads after the first and second gripping heads are traversed to the releasing zone.

19. The method of claim 18 further comprising the step of:
   pushing the first and second packages together in or after the releasing zone of the conveyor system.

\* \* \* \* \*